(12) United States Patent
Karaki et al.

(10) Patent No.: US 11,825,496 B2
(45) Date of Patent: Nov. 21, 2023

(54) TIME RESOURCES FOR UPLINK CHANNELS

(71) Applicant: Telefonaktiebolaget LM Ericsson (publ), Stockholm (SE)

(72) Inventors: Reem Karaki, Aachen (DE); Marco Belleschi, Solna (SE); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/007,134

(22) Filed: Aug. 31, 2020

(65) Prior Publication Data

US 2020/0404671 A1 Dec. 24, 2020

Related U.S. Application Data

(63) Continuation of application No. PCT/EP2019/071477, filed on Aug. 9, 2019.

(Continued)

(51) Int. Cl.
*H04W 72/53* (2023.01)
*H04L 1/1607* (2023.01)
(Continued)

(52) U.S. Cl.
CPC ........... *H04W 72/53* (2023.01); *H04L 1/1614* (2013.01); *H04L 5/0007* (2013.01);
(Continued)

(58) Field of Classification Search
None
See application file for complete search history.

(56) References Cited

U.S. PATENT DOCUMENTS 10,432,368 B1 * 10/2019 Pawar ............... H04L 5/0035
2012/0120927 A1 * 5/2012 Bucknell ............ H04B 7/022
370/336

(Continued)

FOREIGN PATENT DOCUMENTS

JP   2018014761 A   1/2018
WO  2017099860 A1  6/2017

(Continued)

OTHER PUBLICATIONS

ETSO TS 138 214 V15.2.0 (Jul. 2018), "5G; NR; Physical layer procedures for data", 3GPP Jul. 2018, Section 6.1. (Year: 2018).*

(Continued)

*Primary Examiner* — Faruk Hamza
*Assistant Examiner* — Cassandra L Decker
(74) *Attorney, Agent, or Firm* — Murphy, Bilak & Homiller, PLLC

(57) ABSTRACT

Embodiments include methods, performed by a user equipment (UE), for transmitting information on an uplink (UL) shared channel within a cell of a radio access network. Such embodiments include receiving, from a network node serving the cell, a configured uplink grant of resources for transmitting information on the UL shared channel. The uplink grant can indicate particular timeslots during which transmission on the UL shared channel is allowed and can include: a periodicity parameter indicating an uplink periodicity for configured resources, and an allowance parameter indicating a number of timeslots, within each uplink periodicity, during which transmission on the UL shared channel is allowed. Such embodiments also include transmitting information on the UL shared channel during at least one of the particular timeslots indicated by the uplink grant. Embodiments also include complementary methods per- (Continued)

formed by a network node, and UEs and network nodes configured to perform such methods.

24 Claims, 11 Drawing Sheets

Related U.S. Application Data

(60) Provisional application No. 62/717,455, filed on Aug. 10, 2018.

(51) Int. Cl.
*H04W 72/0446* (2023.01)
*H04W 72/1268* (2023.01)
*H04W 72/23* (2023.01)
*H04L 5/00* (2006.01)

(52) U.S. Cl.
CPC ....... *H04L 5/0091* (2013.01); *H04W 72/0446* (2013.01); *H04W 72/1268* (2013.01); *H04W 72/23* (2023.01); *H04L 5/001* (2013.01); *H04L 5/0044* (2013.01); *H04L 5/0048* (2013.01); *H04L 5/0053* (2013.01); *H04L 5/0055* (2013.01)

(56) References Cited

U.S. PATENT DOCUMENTS

| | | | |
|---|---|---|---|
| 2016/0095104 | A1 | 3/2016 | Chen et al. |
| 2016/0183258 | A1 | 6/2016 | Matsuo et al. |
| 2017/0289869 | A1 | 10/2017 | Nogami et al. |
| 2017/0325258 | A1 | 11/2017 | Nogami et al. |
| 2018/0152916 | A9 | 5/2018 | Nigam et al. |
| 2019/0052416 | A1* | 2/2019 | Babaei ................ H04L 1/188 |
| 2019/0053211 | A1* | 2/2019 | Ying .................. H04W 72/044 |
| 2019/0141731 | A1* | 5/2019 | Yoshimoto ............ H04W 76/27 |
| 2019/0149365 | A1* | 5/2019 | Chatterjee ............ H04L 5/0044 370/329 |
| 2019/0200386 | A1* | 6/2019 | Yang .................... H04W 74/08 |
| 2019/0208540 | A1 | 7/2019 | Kim et al. |
| 2019/0342944 | A1* | 11/2019 | Chatterjee ............ H04W 76/27 |
| 2019/0349982 | A1* | 11/2019 | Kompella ......... H04W 72/1268 |
| 2020/0052827 | A1* | 2/2020 | Vilaipornsawai ..... H04L 5/0044 |
| 2020/0178304 | A1* | 6/2020 | Chen .................... H04L 1/1819 |
| 2020/0275485 | A1* | 8/2020 | Babaei ............... H04W 74/004 |
| 2020/0367265 | A1* | 11/2020 | Wang .................... H04W 76/27 |
| 2020/0404671 | A1 | 12/2020 | Karaki et al. |
| 2021/0168849 | A1* | 6/2021 | Oh ........................ H04L 5/0053 |
| 2021/0218538 | A1* | 7/2021 | Myung ............ H04W 72/1268 |
| 2021/0250142 | A1* | 8/2021 | Wang .................... H04L 5/0053 |
| 2021/0314983 | A1 | 10/2021 | Karaki et al. |
| 2021/0385855 | A1* | 12/2021 | Talarico ................ H04L 1/1819 |

FOREIGN PATENT DOCUMENTS

| | | |
|---|---|---|
| WO | 2018106911 A2 | 6/2018 |
| WO | 2018128970 A1 | 7/2018 |
| WO | 2019027297 A1 | 2/2019 |
| WO | 2019029374 A1 | 2/2019 |

OTHER PUBLICATIONS

"3GPP TS 38.401 V15.6.0", 3rd Generation Partnership Project; Technical Specification Group Radio Access Network NG-RAN; Architecture description (Release 15), Jul. 2019, pp. 1-46.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.
"3GPP TS 36.213 V15.2.0", 3rd Generation Partnership Project; Technical Specification Group Radio Access Network Evolved Universal Terrestrial Radio Access (E-UTRA); Physical layer procedures (Release 15), Jun. 2018, pp. 1-541.
"3GPP TS 38.214 V15.5.0",3rd Generation Partnership Project; Technical Specification Group Radio Access Network NR; Physical layer procedures for data (Release 15), Mar. 2019, pp. 1-103.
"On HARQ Codebook", 3GPP WSG-RAN WG1 NR AdHoc#2, R1-1711510, Qingdao, China, Jun. 27-30, 2017, pp. 1-3.
"Details of Dynamic Scheduling Information", 3GPP TSG-RAN WG2 #67, R2-094418 (updates R2-093778), Shenzhen, China, Aug. 24-28, 2009, pp. 1-4.
"Impacts on MAC for NR-U operation", 3GPP TSG RAN WG2 NR #103 Meeting, R2-1811282, Gothenburg, Sweden, Aug. 20-24, 2018, pp. 1-3.
"On impacts of new MCS table for URLLC on MAC procedures", 3GPP TSG-RAN WG2 Meeting #102, R2-1808575, Busan, Korea, May 21-25, 2018, pp. 1-5.
"Remaining issues for UL data transmission procedure", 3GPP TSG RAN WG1 Meeting #92, R1-1801503, Athens, Greece, Feb. 26-Mar. 2, 2018, pp. 1-9.
"Summary of remaining issues on UL data transmission procedure", 3GPP TSG RAN WGJ Meeting #92, R1-1801786, Athens, Greece, Feb. 26-Mar. 2, 2018, pp. 1-8.
"UL data transmission procedure with and without UL grant", 3GPP TSG RAN WGl Meeting #90bis, R1-1717091, Prague, Czech Republic, Oct. 9-13, 2017, pp. 1-18.
"3GPP TS 38.321 V15.2.0,", 3rd Generation Partnership Project; Technical Specification Group Radio Access Network; NR; Medium Access Control (MAC) protocol specification (Release 15), Jun. 2018, pp. 1-73.

* cited by examiner

TIME RESOURCES FOR UPLINK CHANNELS

TECHNICAL FIELD

The present invention generally relates to wireless communication networks, and particularly relates to configuring time resources on an uplink channel.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S (E-UTRAN/EPC interface), each using a specific set of protocols, i.e., Radio Protocols and S Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3, or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC service requires a low latency and high reliability transmission but perhaps for moderate data rates.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. An NR slot can include 14 OFDM symbols with normal cyclic prefix, and 12 OFDM symbols for extended cyclic prefix.

One of the solutions for low latency data transmission is shorter transmission time intervals. In addition to slot-based transmission the NR PHY allows mini-slot transmissions. A mini-slot can include from one symbol up to one less than the number of symbols in a slot, and can start at any symbol within a slot. Even so, the concepts of slot and mini-slot are not specific to a specific service, such that a mini-slot may be used for either eMBB, URLLC, or other services.

Mini-slots can be used if the transmission duration of a slot is too long or the occurrence of the next slot start (slot alignment) is too late. Applications of mini-slots include latency-critical transmissions (in which both mini-slot length and mini-slot frequency are important) and unlicensed spectrum (e.g., NR-U) where the mini-slot frequency is especially important).

For a node to be allowed to transmit in unlicensed spectrum (e.g., 5-GHz band), it typically needs to perform a listen-before-talk (LBT) or a clear channel assessment (CCA). This procedure can include sensing the medium as idle for a number of time intervals, which can be done in various ways including energy detection, preamble detection, or virtual carrier sensing. In virtual carrier sensing, the node reads control information from other transmitting nodes informing when a transmission ends. After sensing the medium idle, a node is typically allowed to transmit for a certain amount of time, referred to as transmission opportunity (TXOP). The length of the TXOP depends on regulation and type of CCA that has been performed, but typically ranges from 1 ms to 10 ms.

With respect to unlicensed spectrum applications, NR mini-slots allow a node to access the channel at much more granular time intervals compared to LTE licensed assisted access (LAA), in which the channel could only be accessed every 500 us. With 60 kHz SCS and a two-symbol mini-slot in NR, for example, the channel can be accessed at 36 μs intervals.

Although the NR mini-slots discussed above provide advantages for unlicensed operation (e.g., NR-U), they also introduce various issues, problems, and/or drawbacks regarding flexibility for assigning or excluding use of particular UL symbols or mini-slots by a UE.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for transmitting information on an uplink (UL) shared channel within a cell of a radio access network (RAN). The exemplary methods and/or procedures can be performed by user equipment (e.g., UE, wireless device, IoT device, modem, etc. or component thereof) in communication with a network node (e.g., base station, eNB, gNB, etc., or components thereof) configured to serve the cell in the RAN.

These exemplary methods and/or procedures can include receiving, from a network node serving the cell, a configuration of resources for transmitting information on the UL shared channel. In some embodiments, the UL shared channel can be a PUSCH. For example, the UE can receive the configuration via DCI over PDCCH or RRC signaling over PDSCH. The configuration can indicate particular timeslots during which transmission on the UL shared channel is allowed, and can include a periodicity parameter indicating a plurality of consecutive timeslots. The configuration can also include an allowance parameter indicating particular timeslots, within the plurality of consecutive timeslots, during which transmission on the UL shared channel is allowed. The allowance parameter can be conveyed in various ways, such as by starting slots, bitmaps, etc. In some embodiments, the configuration can also indicate symbols, with the particular timeslots, during which transmission on the UL shared channel is allowed.

The exemplary methods and/or procedures can also include transmitting information on the UL shared channel during at least one of the particular timeslots indicated by the received configuration.

Other exemplary embodiments of the present disclosure include methods and/or procedures for scheduling transmission, by user equipment (UEs), of information on an uplink (UL) shared channel within a cell of a radio access network (RAN). The exemplary method and/or procedure can be performed by a network node (e.g., base station, eNB, gNB, etc. or component thereof) configured to serve the cell, in communication with user equipment (e.g., UE, wireless device, IoT device, etc. or component thereof).

These exemplary methods and/or procedures can include transmitting, to a UE operating within the cell, a configuration of resources for transmitting information on the UL shared channel. In some embodiments, the UL shared channel can be a PUSCH. For example, the network node can transmit the configuration via DCI over PDCCH or RRC signaling over PDSCH. The configuration can indicate particular timeslots during which transmission on the UL shared channel is allowed, and can include a periodicity parameter indicating a plurality of consecutive timeslots. The configuration can also include an allowance parameter indicating particular timeslots, within the plurality of consecutive timeslots, during which transmission on the UL shared channel is allowed. The allowance parameter can be conveyed in various ways, such as by starting slots, bitmaps, etc. In some embodiments, the configuration can also indicate symbols, with the particular timeslots, during which transmission on the UL shared channel is allowed.

The exemplary methods and/or procedures can also include receiving, from the UE, information on the UL shared channel during at least one of the particular timeslots indicated by the received configuration.

Other exemplary embodiments include network nodes (e.g., base stations, eNBs, gNBs, etc. or component(s) thereof) or user equipment (UEs, e.g., wireless devices, IoT devices, etc. or component(s) thereof) configured to perform operations corresponding to any of the exemplary methods and/or procedures described herein. Other exemplary embodiments include non-transitory, computer-readable media storing program instructions that, when executed by at least one processor, configure such network nodes or UEs to perform operations corresponding to any of the exemplary methods and/or procedures described herein.

These and other objects, features, and advantages of the exemplary embodiments of the present disclosure will become apparent upon reading the following Detailed Description in view of the Drawings briefly described below.

BRIEF DESCRIPTION OF THE DRAWINGS

FIG. 5, which includes

FIG. 6, which includes

DETAILED DESCRIPTION

Figure 1:
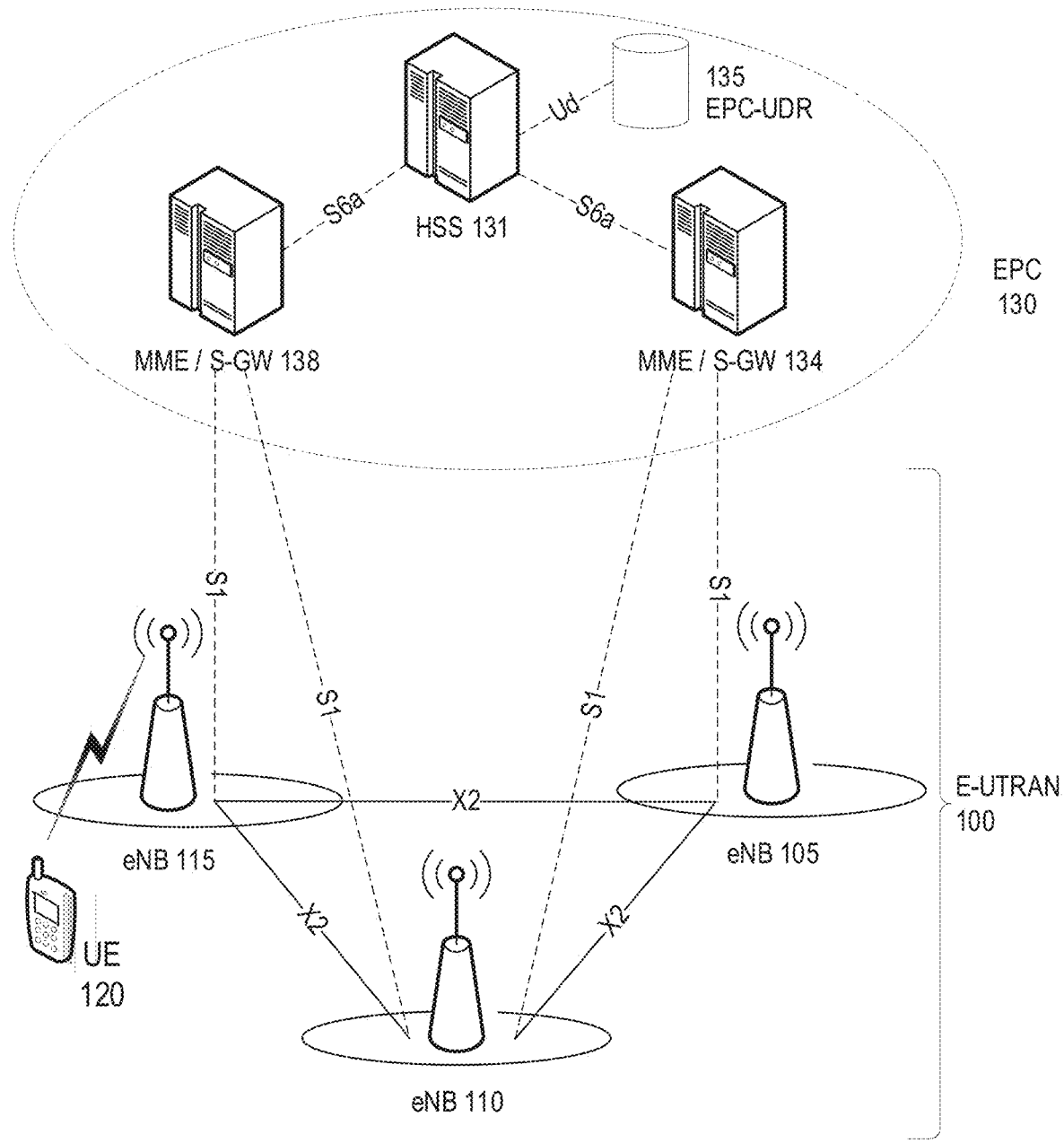
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
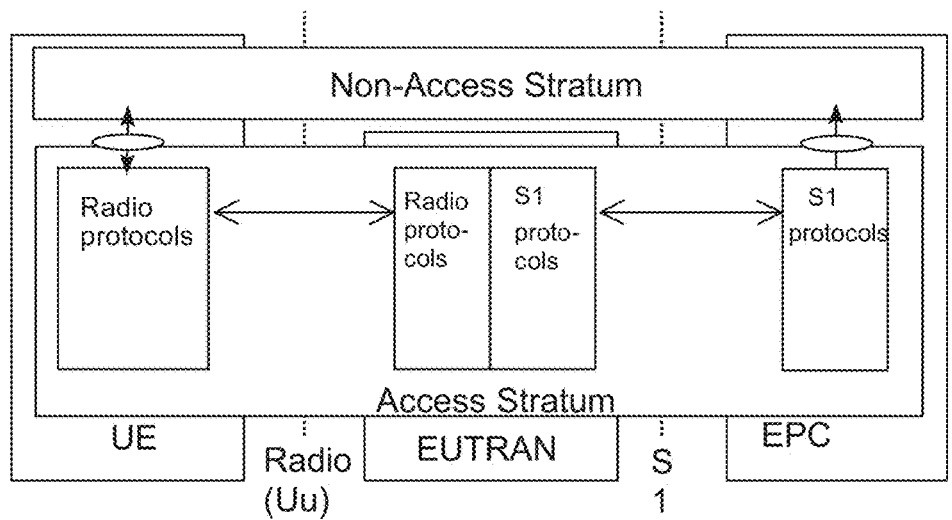
FIG. 2A is a high-level block diagram of an exemplary E-UTRAN architecture in terms of its constituent components, protocols, and interfaces.
Figure 2B:
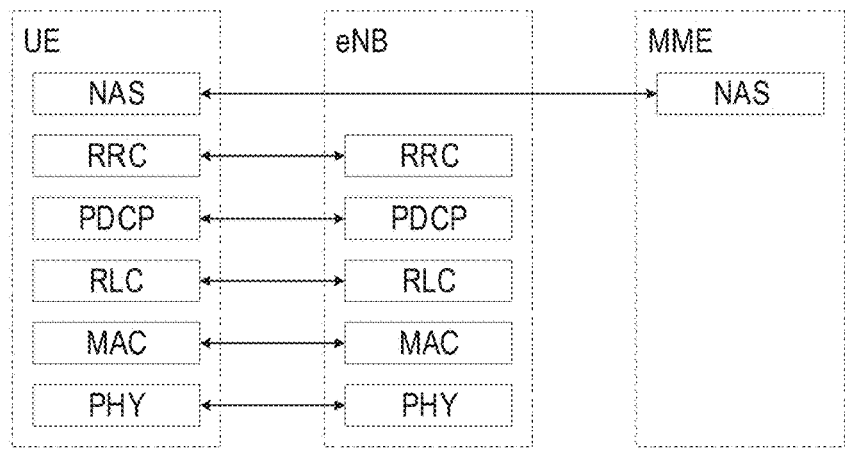
FIG. 2B is a block diagram of exemplary protocol layers of the control-plane portion of the radio (Uu) interface between a user equipment (UE) and the E-UTRAN.
Figure 2C:
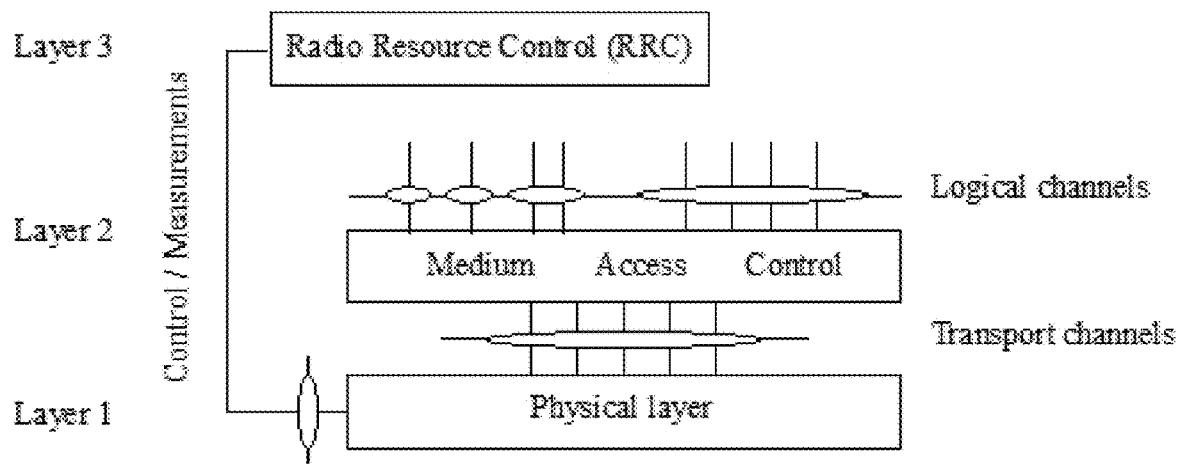
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, although NR mini-slots provide advantages for unlicensed operation (e.g., NR-U), they also introduce various issues, problems, and/or drawbacks with respect to flexibility for assigning or excluding use of particular UL mini-slots by a UE. This is discussed in more detail below, after a more detailed discussion of the NR radio interface.

Figure 4:
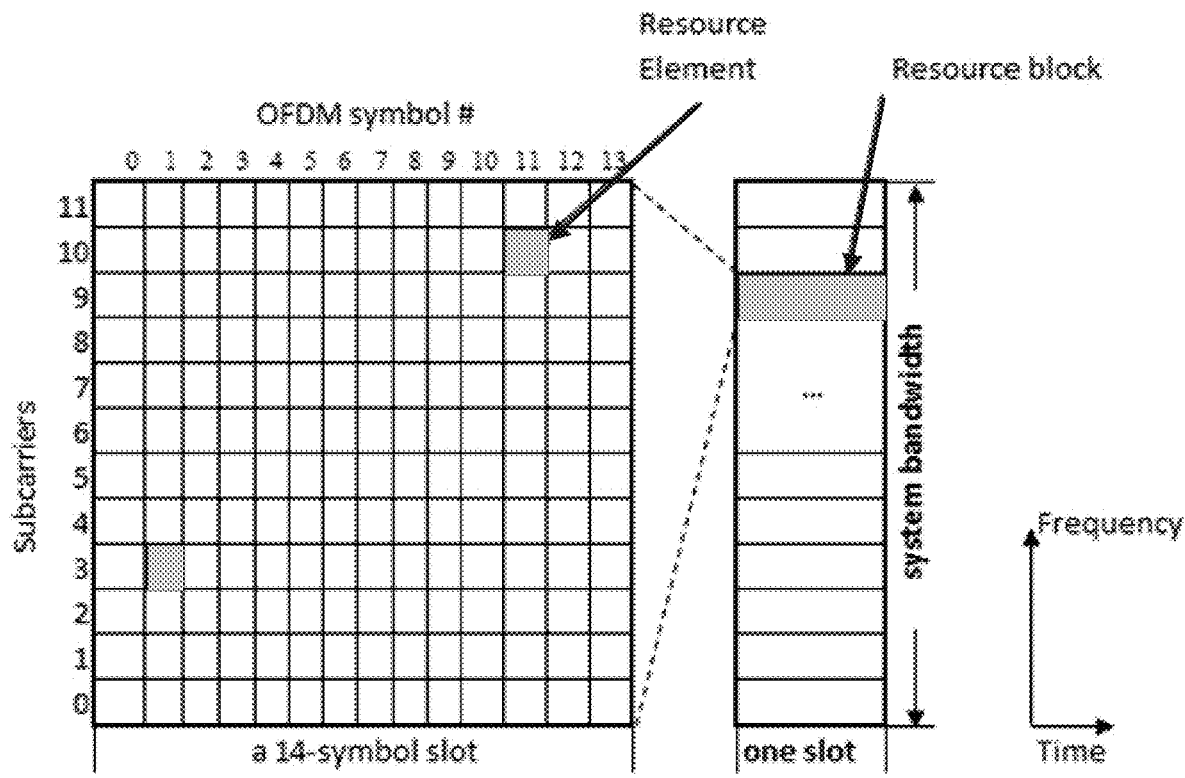
FIG. 4 shows an exemplary time-frequency resource grid for an NR (e.g., 5G) slot.

FIG. 4 shows an exemplary time-frequency resource grid for an NR slot. As illustrated in FIG. 4, a resource block (RB) consists of 12 contiguous, or consecutive, subcarriers in the frequency domain. In this example, the RB spans 14 symbols in the time domain for a duration of a 14-symbol slot, but in other examples may span a different number of symbols. Like in LTE, a resource element (RE) consists of one subcarrier in the frequency domain and one symbol in the time domain. Common RBs (CRBs) are numbered from 0 to the end of the system bandwidth. Each carrier bandwidth part (BWP) configured for a UE has a common reference of CRB 0, such that a particular configured BWP may start at a CRB greater than zero. In this manner, a UE can be configured with a narrow BWP (e.g., 12 MHz) and a wide BWP (e.g., 120 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular carrier BWP. Similar to LTE, each NR resource element (RE) corresponds to one OFDM subcarrier during one OFDM symbol interval. Various subcarrier spacing (SCS) values (referred to as numerologies) are supported in NR and are given by $\Delta f=(15\times 2^\mu)$ kHz where $\mu\in(0,1,2,3,4)$ denotes the numerology value. $\Delta f=15$ kHz is the basic (or reference) subcarrier spacing that is also used in LTE. The slot length is inversely related to subcarrier spacing or numerology according to $\frac{1}{2^\mu}$ ms. For example, there is one (1-ms) slot per subframe for $\Delta f=15$ kHz (µ=0), two 0.5-ms slots per subframe for $\Delta f=30$ kHz (µ=1), etc. In addition, the RB bandwidth is directly related to numerology according to $2^\mu *180$ kHz.

Table 1 below summarizes the supported NR transmission numerologies µ and associated parameters. A UE's DL and UL numerologies can be configured independently by the network, subject to UE support.

TABLE 1

| µ | $\Delta f = 2^\mu \cdot$ 15 [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.112 |

TABLE 1-continued

| µ | $\Delta f = 2^\mu \cdot$ 15 [kHz] | Cyclic prefix | Slot length | RB BW (MHz) |
|---|---|---|---|---|
| 3 | 140 | Normal | 145 µs | 1.44 |
| 4 | 240 | Normal | 62.5 µs | 2.88 |

Figure 5A:
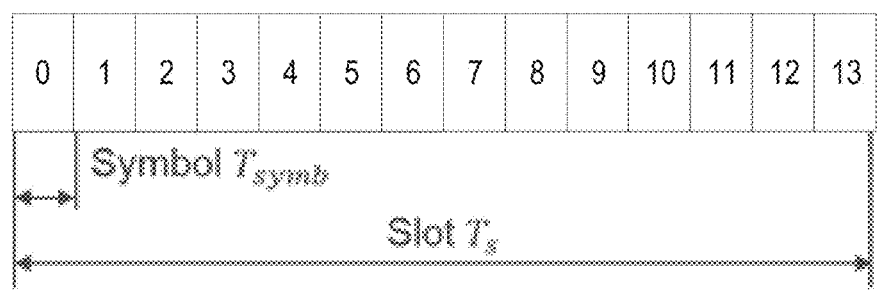
FIGS. 5A and 5B, shows exemplary NR slot and mini-slot configurations.
Figure 5B:
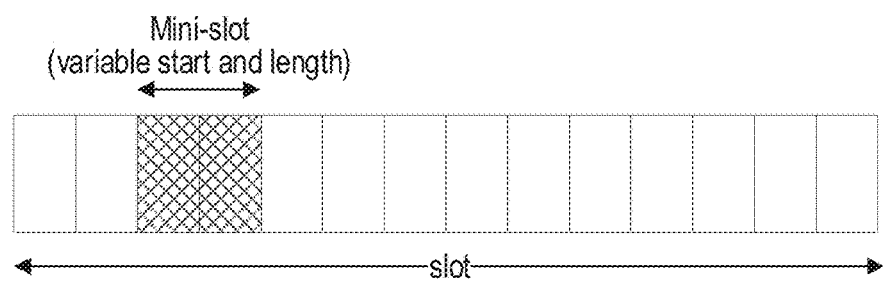

As mentioned above, an NR slot can include 14 OFDM symbols with normal cyclic prefix, and 12 OFDM symbols with extended cyclic prefix. FIG. 5A shows an exemplary NR slot configuration comprising 14 symbols, where the slot and symbol durations are denoted $T_s$ and $T_{symb}$, respectively. As also mentioned above, the NR PHY allows mini-slot transmissions. A mini-slot can include from one symbol up to one less than the number of symbols in a slot, and can start at any symbol within a slot. FIG. 5B shows an exemplary mini-slot arrangement in which the mini-slot begins in the third symbol of the slot and is two symbols in duration.

Figure 6A:
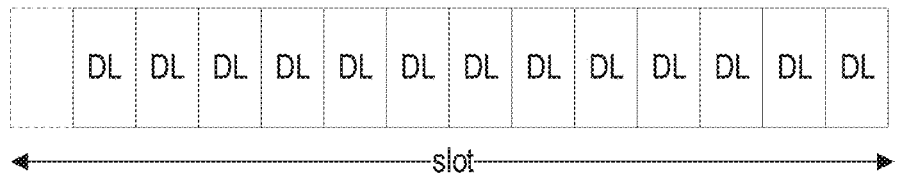
FIGS. 6A-6D, shows various exemplary uplink-downlink (UL-DL) arrangements within an NR slot.
Figure 6B:
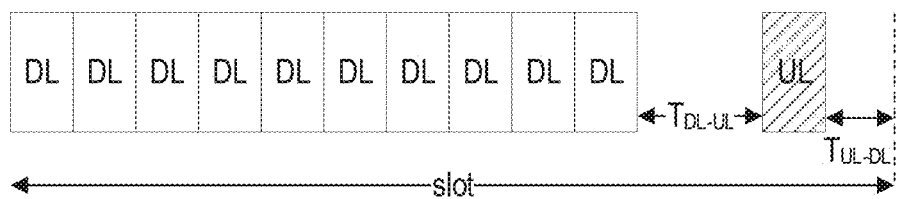
Figure 6C:
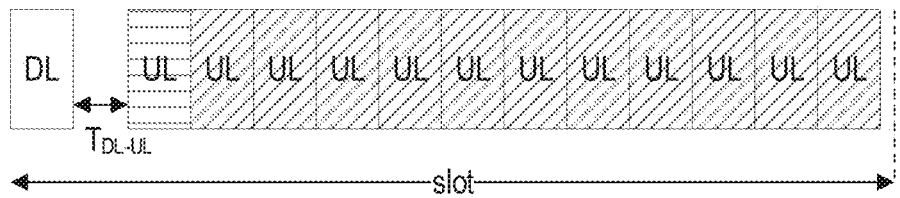
Figure 6D:
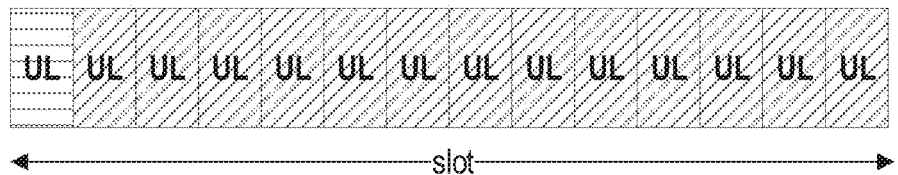

An NR slot can also be arranged with various combinations of UL and DL symbols. FIG. 6, which includes FIGS. 6A-6D, shows various exemplary UL-DL arrangements within an NR slot. For example, FIG. 6A shows an exemplary DL-only (i.e., no UL transmission) slot with transmission starting in symbol 1, i.e., a "late start." FIG. 6B shows an exemplary "DL-heavy" slot with one UL symbol. Moreover, this exemplary slot includes guard periods before and after the UL symbol to facilitate change of transmission direction. FIG. 6C shows an exemplary "UL-heavy" slot with a single UL symbol that can carry DL control information (i.e., the initial UL symbol, as indicated by a different shading style). FIG. 6D shows an exemplary UL-only slot with on-time start in symbol 0, with the initial UL symbol also usable to carry DL control information.

For slot-based transmissions, the base station (e.g., gNB) transmits downlink control information (DCI) over the PDCCH that indicates which UE is scheduled to receive data in that slot, which RBs will carry that data. The DCI can include UL grants that indicate which UE is scheduled to transmit data in that slot, which RBs will carry that data. A UE first detects and decodes an uplink grant from PDCCH and, if successful, then transmits the corresponding PUSCH on the resources indicated by the grant. DCI formats 0_0 and 0_1 are used to convey UL grants for transmission on the PUSCH, while DCI formats 1_0 and 1_1 are used to convey DL grants for transmission on the PDSCH. Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple terminals, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose. The payload together with the identifier-scrambled CRC is encoded and transmitted on the PDCCH.

Each UE tries to detect a PDCCH with multiple candidates with respect to payload size and location in the time-frequency grid based on its configured search spaces. A PDCCH candidate is searched within a common or UE-specific search space that is mapped to a set of time and frequency resources referred to as a control resource set (CORESET). The search spaces within which PDCCH candidates must be monitored are configured to the UE via RRC signaling. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG) which spans one PRB in frequency and one OFDM in time. Each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3 or 6 REGs.

A control channel element (CCE) consists of six (6) REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver. A PDCCH candidate may span 1, 2, 4, 8 or 16 CCEs. If more than one CCE is used, the information in the first CCE is repeated in the other CCEs. Therefore, the number of aggregated CCEs used is referred to as the aggregation level for the PDCCH candidate.

A hashing function can be used to determine the CCEs corresponding to PDCCH candidates that a UE must monitor within a search space set. The hashing is done differently for different UEs. In this manner, the CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI addressed to it and follows the instructions (e.g., scheduling information) contained in the DCI.

A UE determines its RB assignment in the frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR. In NR, two frequency resource allocation schemes, type 0 and type 1, are supported for PUSCH and PDSCH. The type to use for a PUSCH/PDSCH transmission can be defined by an RRC-configured parameter or indicated directly in the corresponding DCI or UL grant in RAR (for which type 1 is used).

The RB indexing for uplink/downlink type 0 and type 1 resource allocation is determined within the UE's active carrier BWP, and the UE shall (upon detection of PDCCH intended for the UE) determine first the uplink/downlink carrier BWP and then the resource allocation within the carrier BWP. The UL BWP for PUSCH carrying msg3 is configured by higher layer parameters.

NR supports two types of pre-configured resources, both of which are similar to existing LTE semi-persistent scheduling (SPS) with some enhancements such as support for transport block (TB) repetitions. In type 1, UL data transmission with configured grant is only based on RRC (re) configuration without any L1 signaling. Type 2 is similar to the LTE SPS feature. UL data transmission with configured grant is based on both RRC configuration and L1 signaling for activation/deactivation of the grant. In this case, a NR gNB needs to explicitly activate the configured resources on PDCCH and the UE confirms reception of the activation/deactivation grant using a MAC control element.

NR TB repetition, mentioned above, involves the same resource configuration being used for K repetitions for a TB (where K includes the initial transmission). Possible values of K are {1, 2, 4, 8}. Repetitions follow a redundancy version (RV) sequence configured by UE-specific RRC signaling to one of the following sequences: {0, 2, 3, 1}, {0, 3, 0, 3}, or {0, 0, 0, 0}.

For both Type 1 and Type 2 pre-configured resources, UL periodicity is configured through higher layer (RRC) signaling. For example, the following periodicities (in symbols) are supported for various configured subcarrier spacing (SCS):

| SCS | Periodicity (sym.) | Possible values of n |
|---|---|---|
| 15 kHz | 2, 7, or n*14 | 1, 2, 4, 5, 8, 10, 16, 20, 32, 40, 64, 80, 128, 160, 320, 640 |
| 30 kHz | | 1, 2, 4, 5, 8, 10, 16, 20, 32, 40, 64, 80, 128, 160, 320, 640, 1280 |
| 60 kHz (normal CP) | | 1, 2, 4, 5, 8, 10, 16, 20, 32, 40, |
| 60 kHz (ext. CP) | 2, 6, or n*12 | 64, 80, 128, 160, 320, 640, 1280, 2560 |

For Type 1 configured grants, the time resources are configured via RRC signalling:
  timeDomainAllocation: Allocation of configured uplink grant in time domain which contains startSymbolAndLength, including S as the starting symbol and L as the length (in symbols) of the PUSCH.
  timeDomainOffset: Offset of a resource with respect to SFN=0 in time domain.

After an uplink grant is configured for a configured grant type 1, the MAC entity shall consider that the $N^{th}$ sequential uplink grant occurs in the symbol that satisfies the following equation (1):

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + N \times periodicity) \bmod (1024 \times numberOfSlotsPerFrame \times numberOfSymbolsPerSlot),$$

where S is the starting symbol specified by timeDomainAllocation.

Similarly, after an uplink grant is configured for a configured grant type 2, the MAC entity shall consider that the N*sequential uplink grant occurs in the symbol that satisfies the following equation (2):

$$[(SFN \times numberOfSlotsPerFrame \times numberOfSymbolsPerSlot) + (\text{slot number in the frame} \times numberOfSymbolsPerSlot) + \text{symbol number in the slot}] = [SFN_{start\ time} \times numberOfSlotsPerFrame \times$$

numberOSymbolsPerSlot+slot$_{start\ time}$×numberOfSymbolsPerSlot+symbol$_{start\ time}$+N×periodicity] modulo (1024×numberOfSlotsPerFrame×numberOSymbolsPerSlot), where SFN$_{start\ time}$, slot$_{start\ time}$, and symbol$_{start\ time}$ are the SFN, slot, and symbol, respectively, of the first transmission of PUSCH where the configured uplink grant was (re-) initialised.

For example, assuming 30-kHz subcarrier spacing, to configure UL resources on consecutive slots, a UE must be configured with one of the following:

Periodicity=2 symbols, S=0, L=2;
Periodicity=7 symbols, S=0, L=7; and
Periodicity=14 symbols (i.e., 1 slot, n=1), S=0, L=14, where S is the starting symbol and L is the length (in symbols) of PUSCH as configured in timeDomainAllocation.

Configurations similar to the three above are suitable for unlicensed operation because they permit UL transmission on consecutive slots without gaps in between. All three configurations allow a UE to transmit a configured UL in all slots, but the number of PUSCH lengths within a slot differs among the configurations. However, it would be very restrictive if the only way to efficiently use configured UL on an unlicensed channel is by allowing the UE to transmit in every slot. It would be desirable for the network (e.g., serving gNB) to have some flexibility in assigning or excluding certain slots for configured UL. Furthermore, timeDomainAllocation is applied to every configured UL slot, which means that even if the UE is configured with one-slot periodicity (i.e., 14 or 12 symbols, depending on CP), the S and L should be configured such that no gaps are introduced between consecutive UL slots within an UL burst.

Accordingly, exemplary embodiments of the present disclosure provide techniques to indicate and assign time resources for configured UL UEs for operation in unlicensed spectrum. For example, by assigning different transmission starting symbols, such techniques can reduce contention between intra-configured UL UEs that are assigned the same UL resources.

In various embodiments, pertaining to both type-1 and type-2 configured UL grants discussed above, applicable UL slots can be configured (e.g., via RRC signaling) with an Allowance parameter in addition to the Periodicity parameter discussed above. For example, the Allowance parameter (also referred to below as "D") can indicate a duration of the configured grant, within each period identified by the Periodicity parameter, that is allowed for UL transmission. As a more specific example (explained further below), the Allowance parameter can indicate a number of consecutive slots in every period identified by the Periodicity parameter.

Furthermore, the absence of an Allowance parameter in the configuration can be interpreted by the UE as a one-slot duration in every period. When the Allowance parameter is included, it can indicate a minimum configuration of two slots to a maximum configuration of floor(Periodicity/numberOfSymbolsPerSlot)−1, with Periodicity given in symbols. As mentioned above, numberOSymbolsPerSlot can be 14 and 12 for normal and extended CP, respectively.

In certain embodiments, after a type-2 uplink grant is configured in the manner described above, the MAC entity can consider that the $(d+N \times D)^{th}$ sequential uplink grants (where d=0, 1, ... D−1) occur in the symbols that satisfies the following equation (3):

[(SFN×numberOfSlotsPerFrame×numberOSymbolsPerSlot)+(slot number in the frame×numberOSymbolsPerSlot)+symbol number in the slot]=[SFN$_{start\ time}$×numberOfSlotsPerFrame×numberOfSymbolsPerSlot+(d+slot$_{start\ time}$)×numberOfSymbolsPerSlot+symbol$_{start\ time}$+N×periodicity] modulo (1024×numberOfSlotsPerFrame×numberOSymbolsPerSlot), where again SFN$_{start\ time}$, slot$_{start\ time}$, and symbol$_{start\ time}$ are the SFN, slot, and symbol, respectively, of the first transmission of PUSCH where the configured uplink grant was (re-)initialised.

Figure 7:
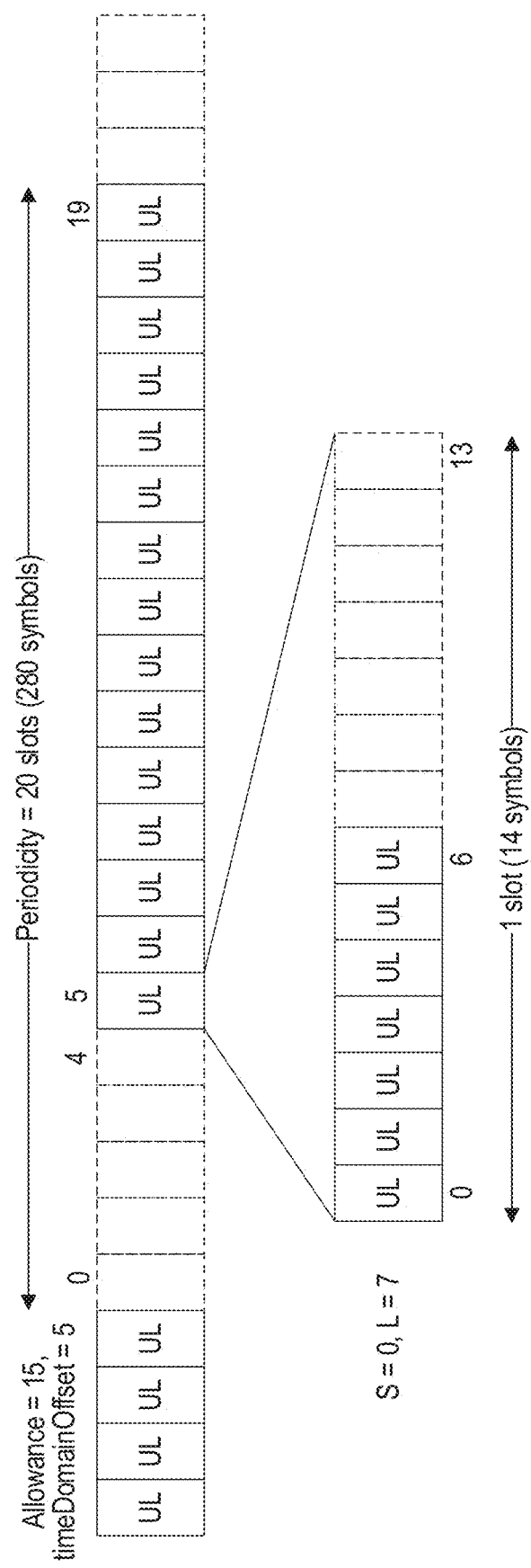
FIGS. 7-8 show timing diagrams that illustrate two exemplary configured UL grants, according to various exemplary embodiments of the present disclosure.

As an example, for 30-kHz SCS, the network can configure Periodicity=280 symbols (or 20 slots, corresponding to n=20) and Allowance=15. With type-1 configured grant with timeDomainOffset=5, the UE configured in this manner is allowed to perform UL transmissions (without dynamic grants) in slots 5, 6, ..., 19 within each 20-slot periodicity. Likewise, with type-2 configured grant, after receiving a configured UL grant indicating starting slot 5, the UE configured in this manner is allowed to perform UL transmissions (without dynamic grants) in slots 5, 6, ..., 19 within each 20-slot periodicity. In this manner, the network can protect slots 0-4 within each periodic 20-slot duration from channel access by UEs with configured UL grants. FIG. 7 shows a timing diagram illustrating a configured UL grant having Periodicity=280 symbols (or 20 slots), timeDomainOffset=5, Allowance=15, S=0, and L=7.

In some embodiments, equation (3) above can be applied with respect to a predefined slot (or TTI) number (e.g., SFN 0) rather than with respect to the time at which the configured UL grant was (re-)initialized. In other words, the Periodicity, timeDomainOffset, etc. can be specified with respect to a predefined slot number.

Figure 8:
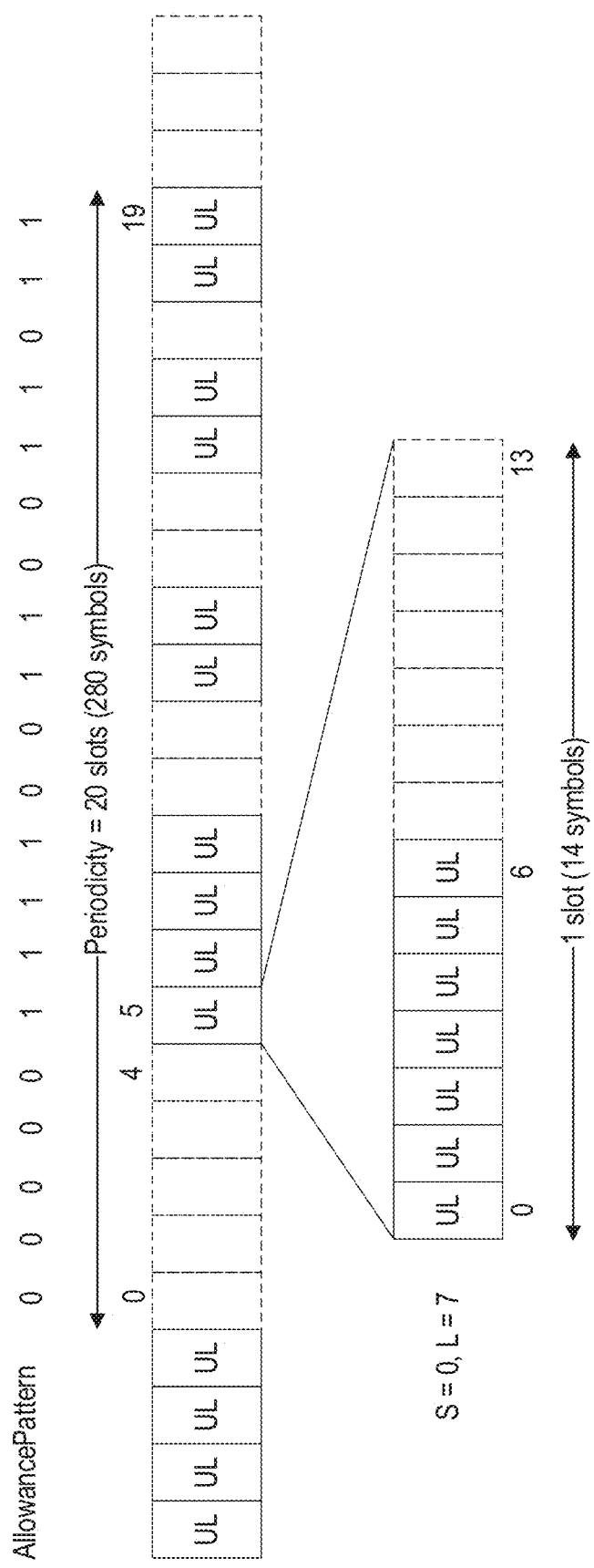

In other embodiments, rather than configuring the UE with an Allowance indicating a duration (e.g., number of consecutive slots) of the configured grant in every period, the UE instead can be configured (e.g., via DCI or RRC signalling) with an AllowancePattern indicating the particular allowed slots within each period given by Periodicity. Considering the 20-slot (280-symbol) Periodicity example discussed above, a bitmap having one bit corresponding to each of the 20 slots can be used to indicate allowance (or prohibition) of UL transmission in each of the slots. In this manner, the network can allow UL transmissions in consecutive and/or non-consecutive slots. FIG. 8 shows a timing diagram illustrating a configured UL grant having Periodicity=280 symbols (or 20 slots), S=0, L=7, and an AllowancePattern bitmap.

In some embodiments, the UE can also be configured with additional information indicating particular symbols within the allowed slots (which in turn can be indicated in any manner described above). For example, the UE can be configured with a starting symbol of the first slot in a configured UL burst and/or an ending symbol of the last slot in a configured UL burst (or alternatively, the length of the last slot in a configured UL burst).

In some embodiments, instead of providing a configuration including timeDomainAllocation that indicates starting symbol (S) and length (L, in symbols) of the PUSCH in configured UL burst, the network can instead provide a configuration including a parameter (which can be called timeDomainAllocation or given a different name) that indicates a starting symbol (S) of the first slot in a configured UL burst, and a length (L) of the last slot in the configured UL burst (i.e., the number of symbols available at the beginning of the last slot). The first and last (allowed) slots can be indicated according to any of the embodiments described above, such as an Allowance value (as illustrated in FIG. 7) or an AllowancePattern (as illustrated in FIG. 8).

In some embodiments, the UE can also be configured with a mini-slot periodicity that indicates the periodicity of PUSCH starting position within allowed slots. For example, if the mini-slot periodicity is set to two (2), the UE may send consecutive PUSCHs of two (2) symbol lengths in a slot that is allowed for configured UL.

Figure 9:
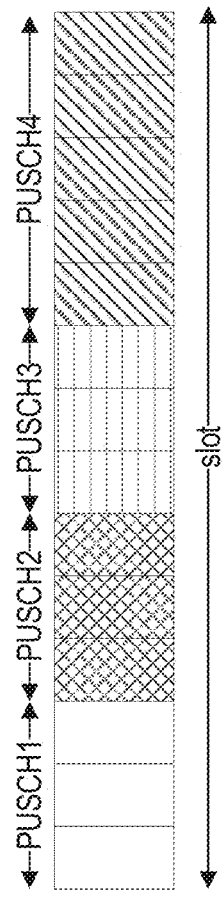
FIG. 9 shows an exemplary physical uplink shared channel (PUSCH) pattern configuration within an allowed slot as indicated by a configured UL grant, according to various exemplary embodiments of the present disclosure.

In other embodiments, the UE can also be configured with a mini-slot pattern that indicates a certain pattern allowed for PUSCH transmission within slots configured as being allowed. For example, the pattern can be configured by indicating the minimum and/or maximum number of mini-slots/symbols that can be used for transmitting transport blocks (TBs) associated with a particular HARQ process. FIG. 9 shows an exemplary PUSCH pattern configuration within an allowed slot as indicated by a configured UL grant, according to these embodiments. For example, the intra-slot configuration shown in FIG. 9 can be used with other embodiments that indicate allowed slots within a periodicity, such as an Allowance value (as illustrated in FIG. 7) or an AllowancePattern (as illustrated in FIG. 8).

In other embodiments, the UE can also be configured with a PUSCH starting position bitmap that indicates the symbol (within the configured allowed slots) in which configured UL PUSCH may start. The length of the PUSCH does not necessarily need to be configured, but a UE receiving a PUSCH starting position bitmap can infer a PUSCH length in various ways, such as:

From an indicated starting position until the end of the allowed slot; or

In case multiple starting positions are indicated in the bitmap (e.g., with multiple 1's interspersed with 0's), each length can be interpreted as extending until the next indicated starting position. For example, if the bit map is configured as 10010000100000, a PUSCH transmission starts at the fourth symbol with a length of five symbols, while another PUSCH transmission can start at the ninth symbol with a length of six symbols.

Although the above intra-slot (or mini-slot) configuration embodiments have been described as applying to all slots configured as allowed for UL transmission, in the alternative these embodiments can be applicable to only a first allowed slot. For example, later slots within the same UL burst can be transmitted using slot-based scheduling. As another example, the configuration can be applicable only for specific traffic classes or traffic types, e.g., QCIs mapped to channel access priority classes above a certain threshold.

Figure 10:
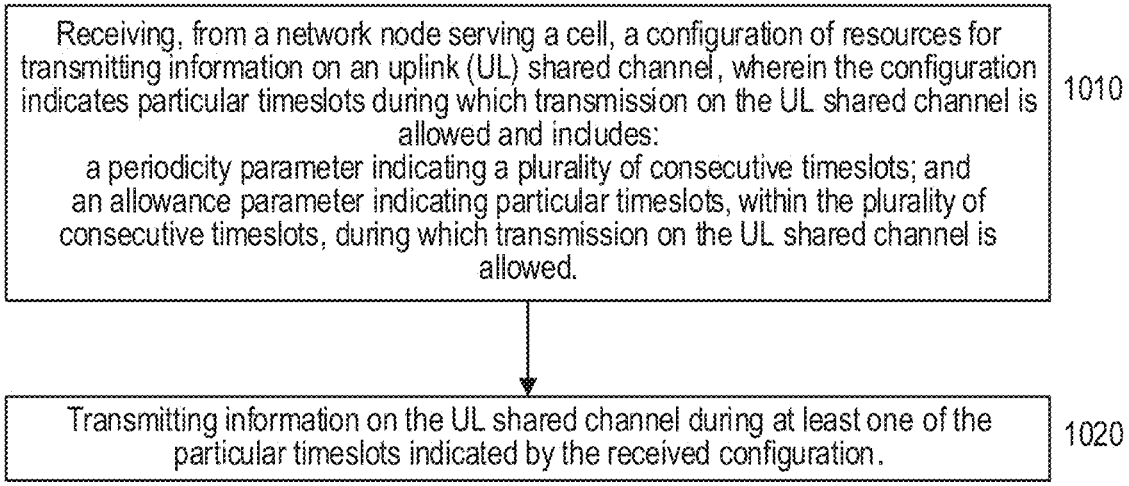
FIG. 10 is a flow diagram of an exemplary method and/or procedure for transmitting information on an uplink (UL) shared channel within a cell of a radio access network (RAN), according to various exemplary embodiments of the present disclosure.

FIG. 10 shows a flow diagram of an exemplary method and/or procedure for transmitting information on an uplink (UL) shared channel within a cell of a radio access network (RAN). The exemplary method and/or procedure can be performed by a user equipment (e.g., UE, wireless device, IoT device, modem, etc. or component thereof) in communication with a network node (e.g., base station, eNB, gNB, etc., or components thereof) configured to serve the cell in the RAN. Furthermore, the exemplary method and/or procedure shown in FIG. 10 can be utilized cooperatively with other exemplary methods and/or procedures described herein (e.g., FIG. 11) to provide various exemplary benefits described herein. Although FIG. 10 shows blocks in a particular order, this order is merely exemplary and the operations of the exemplary method and/or procedure can be performed in a different order than shown, and can be combined and/or divided into blocks having different functionality than shown. Optional blocks or operations are indicated by dashed lines.

The exemplary method and/or procedure illustrated in FIG. 10 can include the operations of block 1010, where the UE can receive, from a network node serving the cell, a configuration of resources for transmitting information on the UL shared channel. In some embodiments, the UL shared channel can be a PUSCH. For example, the UE can receive the configuration via DCI over PDCCH or RRC signaling over PDSCH. The configuration can indicate particular timeslots during which transmission on the UL shared channel is allowed, and can include a periodicity parameter indicating a plurality of consecutive timeslots. The configuration can also include an allowance parameter indicating a number of timeslots, within the plurality of consecutive timeslots, during which transmission on the UL shared channel is allowed. In some examples, the allowance parameter indicates particular timeslots during which transmission on the UL shared channel is allowed, for example when the allowance parameter is in the form of the AllowancePattern described above.

The exemplary method and/or procedure can also include operations of block 1020, where the UE can transmit information on the UL shared channel during at least one of the particular timeslots indicated by the received configuration (e.g., in block 1010).

In some embodiments, the allowance parameter can indicate a number of consecutive timeslots within the plurality of consecutive timeslots. An example of this type of allowance parameter is 'Allowance' described above. In some of these embodiments, the configuration can further identify a starting timeslot within the plurality of consecutive timeslots, such that the particular timeslots can include the number of timeslots beginning with the starting timeslot.

In other embodiments, the allowance parameter can comprise a first bitmap including a first plurality of bits. In such embodiments, each bit in the first bitmap can indicate whether transmission on the UL shared channel is allowed during a particular one of the consecutive timeslots. For example, a value of "1" can indicate that transmission is allowed, while a value of "0" can indicate that transmission is not allowed. An example of this type of allowance parameter is 'AllowancePattern' described above.

As discussed above in relation to various figures, each timeslot can comprise a plurality of symbols (e.g., 14 or 12). In some embodiments, the configuration can further identify particular symbols, of the plurality, during which transmission on the UL shared channel is allowed within the particular timeslots indicated by the configuration.

In some of these embodiments, the identification of the particular symbols can include a starting symbol and a number of consecutive symbols. In such embodiments, the starting symbol and the number of consecutive symbols are applicable to each of the particular timeslots indicated by the configuration (e.g., to indicated symbols allowable for transmission by the UE).

In other of these embodiments, the particular timeslots can include a starting timeslot and an ending timeslot. In such embodiments, the identification of the particular symbols can include a starting symbol associated with the starting timeslot, and an ending symbol associated with the ending timeslot.

In some embodiments, the configuration can also include information identifying one or more instances of the UL shared channel within each of the particular timeslots during which transmission on the UL shared channel is allowed. In some of these embodiments, the configuration can include a periodicity of the UL shared channel within each of the particular timeslots during which transmission on the UL shared channel is allowed. For example, the configuration can indicate a mini-slot periodicity that indicates the periodicity of PUSCH starting position within allowed timeslots, as discussed above.

In other of these embodiments, the configuration can indicate the respective starting positions of a plurality of UL shared channel instances within at least a portion of the particular timeslots during which transmission on the UL shared channel is allowed. For example, the configuration can indicate the respective starting positions by a second bitmap including a second plurality of bits. The second plurality of bits can be associated with respective symbols within each of the particular timeslots during which transmission on the UL shared channel is allowed. As a more specific example, a bitmap value of "1" can indicate an UL shared channel starting symbol with length interpreted as extending until the next indicated starting symbol, as discussed above.

In some embodiments, the configuration can also indicate whether the configuration is applicable to all of the particular timeslots, or only to a subset of the particular timeslots (e.g., only an initial timeslot). In some embodiments, the configuration can also indicate to which traffic classes the configuration is applicable.

Figure 11:
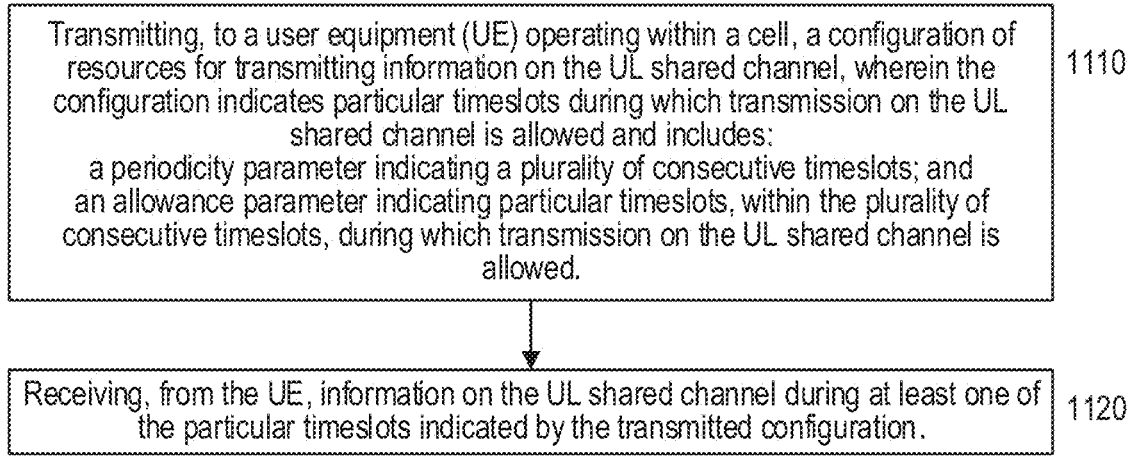
FIG. 11 is a flow diagram of an exemplary method and/or procedure for scheduling transmission, by user equipment (UEs), of information on an uplink (UL) shared channel within a cell of a RAN, according to one or more exemplary embodiments of the present disclosure.

FIG. 11 shows a flow diagram of an exemplary method and/or procedure for scheduling transmission, by user equipment (UEs), of information on an uplink (UL) shared channel within a cell of a radio access network (RAN). The exemplary method and/or procedure can be performed by a network node (e.g., base station, eNB, gNB, etc., or component thereof) configured to serve the cell, in communication with user equipment (e.g., UE, wireless device, IoT device, modem, etc. or component thereof). Furthermore, the exemplary method and/or procedure shown in FIG. 11 can be utilized cooperatively with other exemplary methods and/or procedures described herein (e.g., FIG. 10), to provide various exemplary benefits described herein. Although FIG. 11 shows blocks in a particular order, this order is merely exemplary and the operations of the exemplary method and/or procedure can be performed in a different order than shown, and can be combined and/or divided into blocks having different functionality than shown. Optional blocks or operations are indicated by dashed lines.

The exemplary method and/or procedure illustrated in FIG. 11 can include the operations of block 1110, where the network node can transmit, to a UE operating within the cell, a configuration of resources for transmitting information on the UL shared channel.

In some embodiments, the UL shared channel can be a PUSCH. For example, the network node can transmit the configuration via DCI over PDCCH or RRC signaling over PDSCH. The configuration can indicate particular timeslots during which transmission on the UL shared channel is allowed, and can include a periodicity parameter indicating a plurality of consecutive timeslots. The configuration can also include an allowance parameter indicating a number of timeslots, within the plurality of consecutive timeslots, during which transmission on the UL shared channel is allowed. In some examples, the allowance parameter indicates particular timeslots during which transmission on the UL shared channel is allowed, for example when the allowance parameter is in the form of the AllowancePattern described above.

The exemplary method and/or procedure can also include operations of block 1120, where the network node can receive, from the UE, information on the UL shared channel during at least one of the particular timeslots indicated by the transmitted configuration.

In some embodiments, the allowance parameter can indicate a number of consecutive timeslots within the plurality of consecutive timeslots. An example of this type of allowance parameter is 'Allowance' described above. In some of these embodiments, the configuration can further identify a starting timeslot within the plurality of consecutive timeslots, such that the particular timeslots can include the number of timeslots beginning with the starting timeslot.

In other embodiments, the allowance parameter can comprise a first bitmap including a first plurality of bits. In such embodiments, each bit in the first bitmap can indicate whether transmission on the UL shared channel is allowed during a particular one of the consecutive timeslots. For example, a value of "1" can indicate that transmission is allowed, while a value of "0" can indicate that transmission is not allowed. An example of this type of allowance parameter is 'AllowancePattern' described above.

As discussed above in relation to various figures, each timeslot can comprise a plurality of symbols (e.g., 14 or 12). In some embodiments, the configuration can further identify particular symbols, of the plurality, during which transmission on the UL shared channel is allowed within the particular timeslots indicated by the configuration.

In some of these embodiments, the identification of the particular symbols can include a starting symbol and a number of consecutive symbols. In such embodiments, the starting symbol and the number of consecutive symbols are applicable to each of the particular timeslots indicated by the configuration (e.g., to indicated symbols allowable for transmission by the UE).

In other of these embodiments, the particular timeslots can include a starting timeslot and an ending timeslot. In such embodiments, the identification of the particular symbols can include a starting symbol associated with the starting timeslot, and an ending symbol associated with the ending timeslot.

In some embodiments, the configuration can also include information identifying one or more instances of the UL shared channel within each of the particular timeslots during which transmission on the UL shared channel is allowed. In some of these embodiments, the configuration can include a periodicity of the UL shared channel within each of the particular timeslots during which transmission on the UL shared channel is allowed. For example, the configuration can indicate a mini-slot periodicity that indicates the periodicity of PUSCH starting position within allowed timeslots, as discussed above.

In other of these embodiments, the configuration can indicate the respective starting positions of a plurality of UL shared channel instances within at least a portion of the particular timeslots during which transmission on the UL shared channel is allowed. For example, the configuration can indicate the respective starting positions by a second bitmap including a second plurality of bits. The second plurality of bits can be associated with respective symbols within each of the particular timeslots during which transmission on the UL shared channel is allowed. As a more specific example, a bitmap value of "1" can indicate an UL shared channel starting symbol with length interpreted as extending until the next indicated starting symbol, as discussed above.

In some embodiments, the configuration can also indicate whether the configuration is applicable to all of the particular timeslots, or only to a subset of the particular timeslots (e.g., only an initial timeslot). In some embodiments, the configuration can also indicate to which traffic classes the configuration is applicable.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 12:
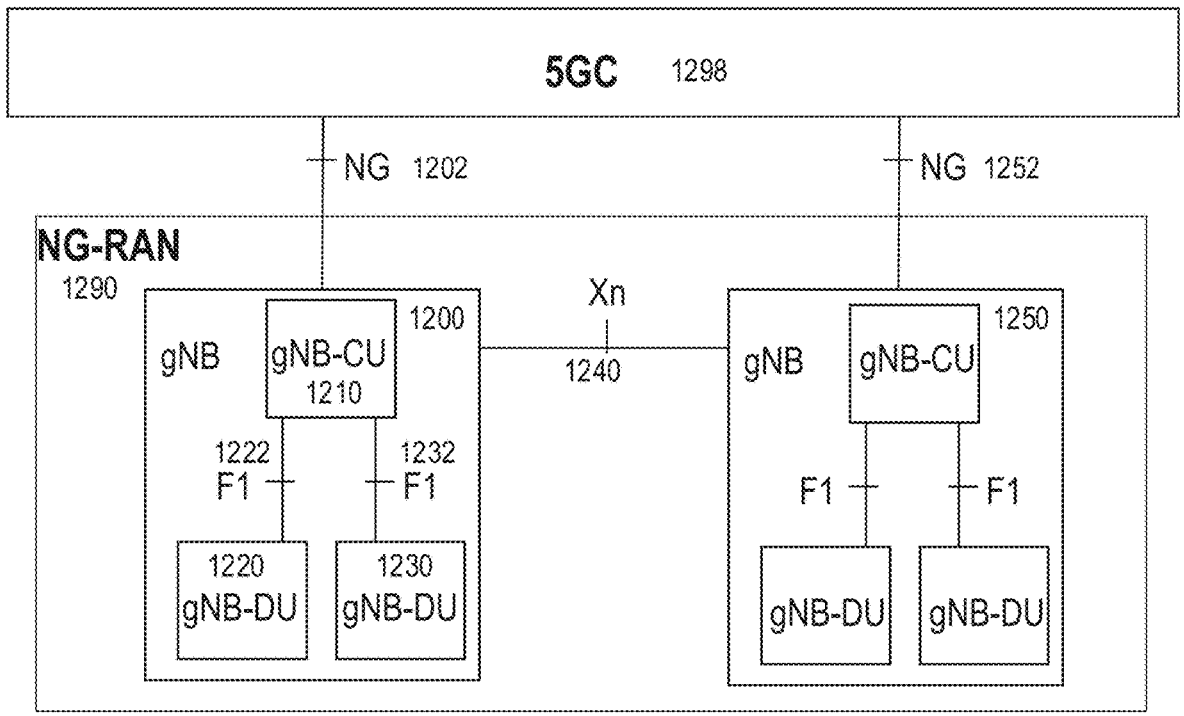
FIGS. 12-13 illustrate two high-level views of an exemplary 5G network architecture.

FIG. 12 illustrates a high-level view of the 5G network architecture, consisting of a Next Generation RAN (NG-RAN) 1299 and a 5G Core (5GC) 1298. NG-RAN 1299 can include a set gNBs connected to the 5GC via one or more NG interfaces, such as gNBs 1200, 1250 connected via interfaces 1202, 1252, respectively. In addition, the gNBs can be connected to each other via one or more Xn interfaces, such as Xn interface 1240 between gNBs 1200 and 1250.

NG-RAN 1299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

The NG-RAN logical nodes shown in FIG. 12 (and described in 3GPP TS 38.401 and 3GPP TR 38.801) include a central (or centralized) unit (CU or gNB-CU) and one or more distributed (or decentralized) units (DU or gNB-DU). For example, gNB 1200 includes gNB-CU 1210 and gNB-DUs 1220 and 1230. CUs (e.g., gNB-CU 1210) are logical nodes that host higher-layer protocols and perform various gNB functions such controlling the operation of DUs. Similarly, each DU is a logical node that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
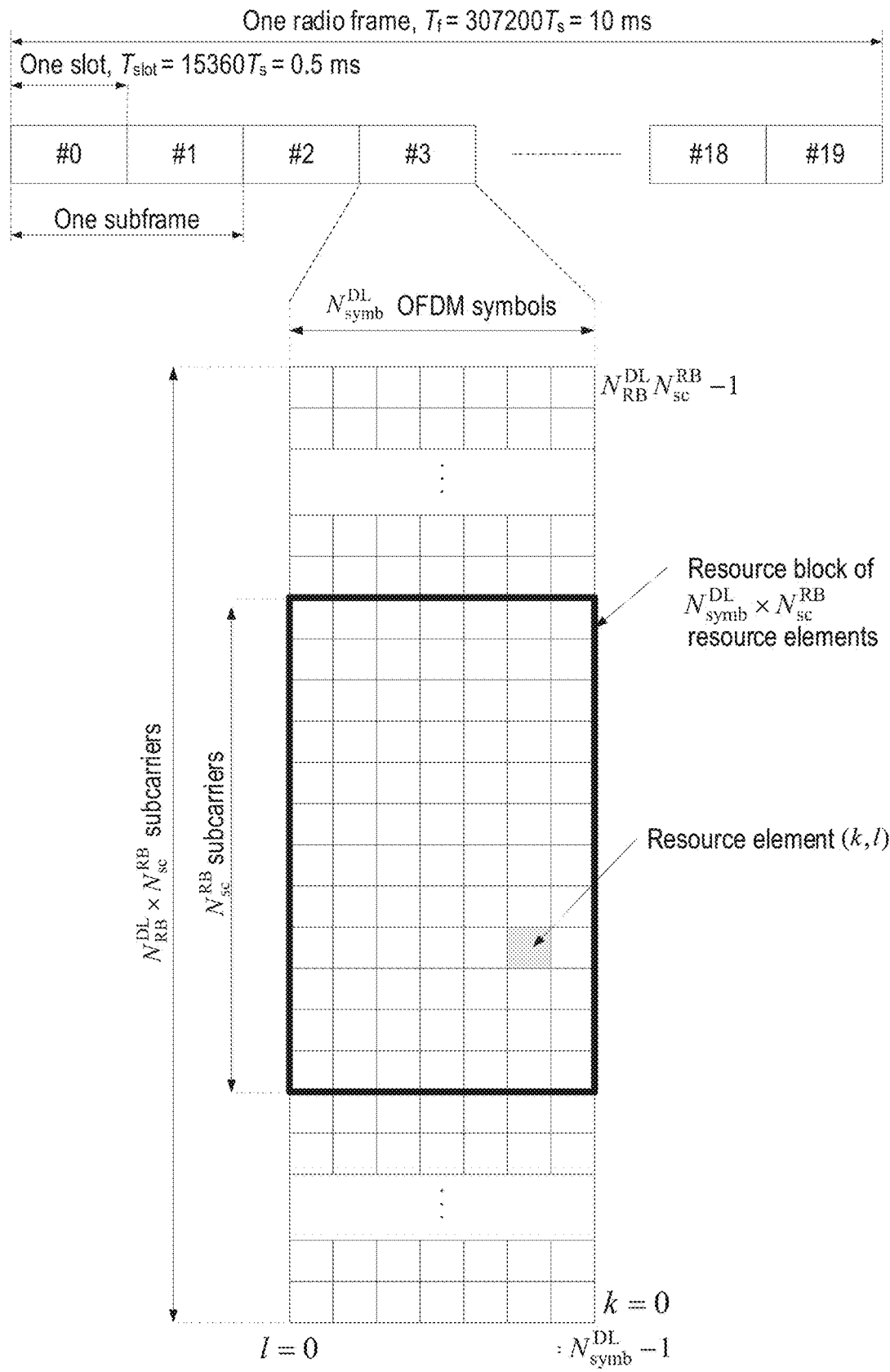
FIGS. 3A and 3B are block diagrams, respectively, of exemplary downlink and uplink LTE radio frame structures used for frequency division duplexing (FDD) operation.
Figure 3B:
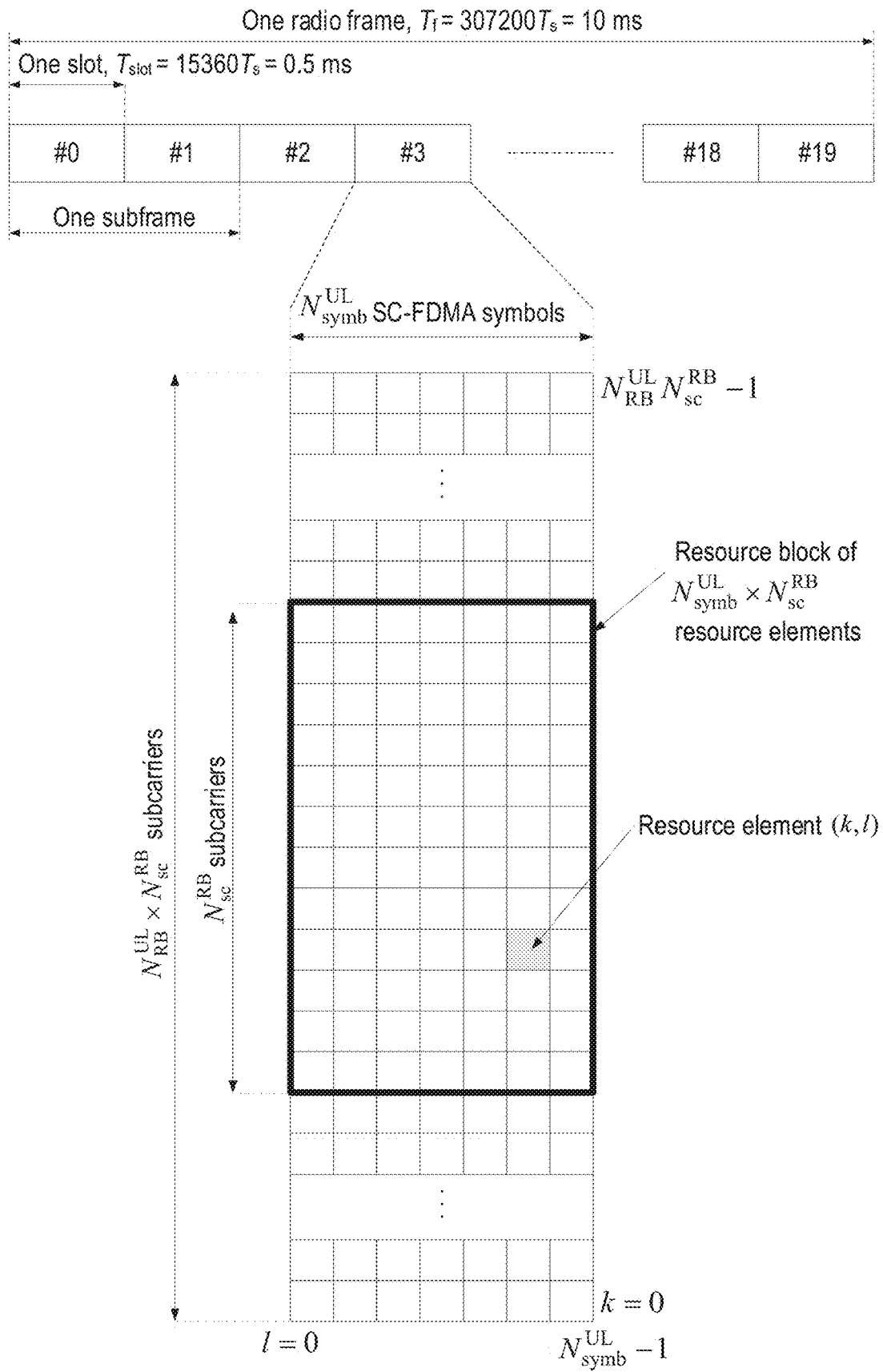

A gNB-CU connects to gNB-DUs over respective F1 logical interfaces, such as interfaces 1222 and 232 shown in FIG. 3. The gNB-CU and connected gNB-DUs are only visible to other gNBs and 5GC 1298 as a gNB. In other words, the F1 interface is not visible beyond a gNB-CU.

Figure 13:
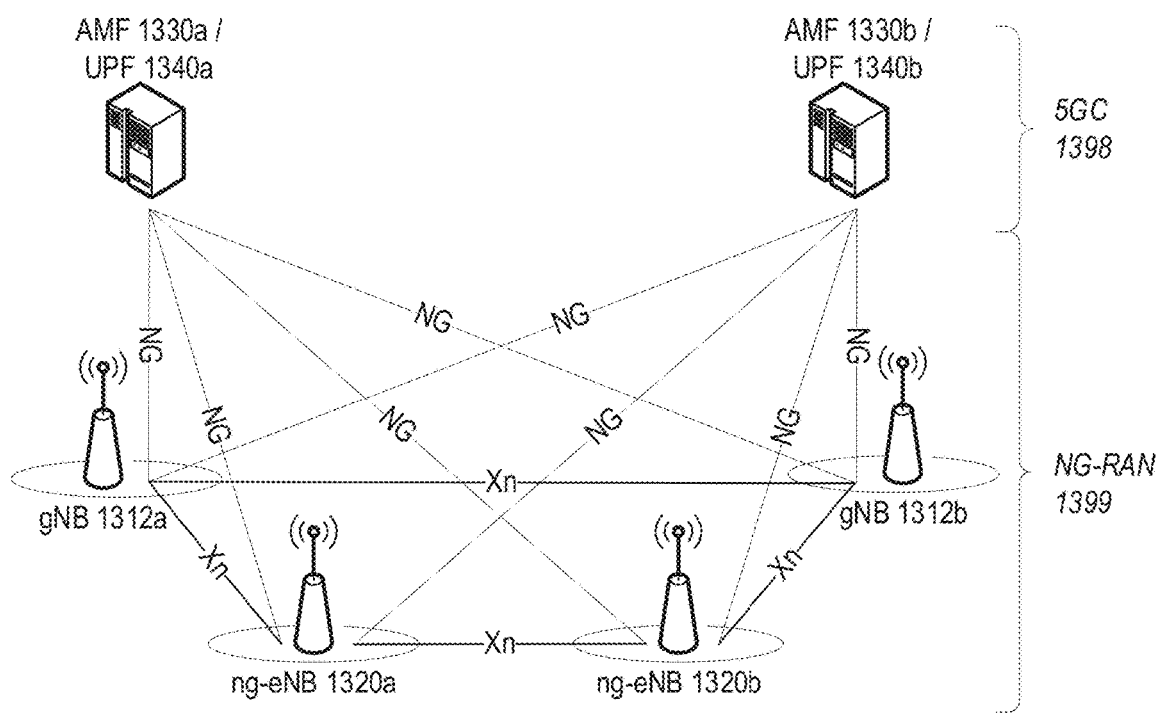

FIG. 13 shows a high-level view of an exemplary 5G network architecture, including a Next Generation Radio Access Network (NG-RAN) 1399 and a 5G Core (5GC) 1398. As shown in the figure, NG-RAN 1399 can include gNBs 1310 (e.g., 1310a,b) and ng-eNBs 1320 (e.g., 1320a,b) that are interconnected with each other via respective Xn interfaces. The gNBs and ng-eNBs are also connected via the NG interfaces to 5GC 1398, more specifically to the AMF (Access and Mobility Management Function) 1330 (e.g., AMFs 1330a,b) via respective NG-C interfaces and to the UPF (User Plane Function) 1340 (e.g., UPFs 1340a,b) via respective NG-U interfaces.

Each of the gNBs 1310 can support the NR radio interface, including frequency division duplexing (FDD), time division duplexing (TDD), or a combination thereof. In contrast, each of ng-eNBs 1320 supports the LTE radio interface but, unlike conventional LTE eNBs, connect to the 5GC via the NG interface.

Figure 14:
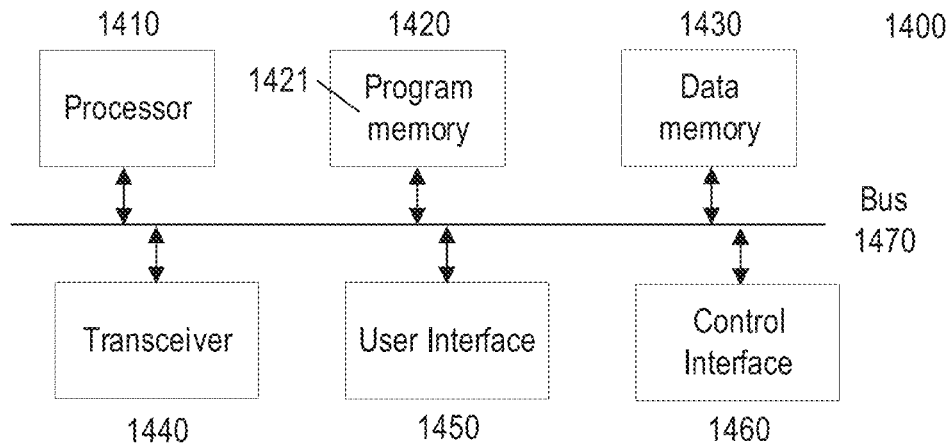
FIG. 14 illustrates a block diagram of an exemplary wireless device or UE configurable according to various exemplary embodiments.

FIG. 14 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above.

Exemplary device 1400 can comprise a processor 1410 that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product 1421 in FIG. 14) executed by processor 1410 that can configure and/or facilitate device 1400 to perform various operations, including operations described below. For example, execution of such instructions can configure and/or facilitate exemplary device 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with transceiver 1440, user interface 1450, and/or host interface 1460.

As another example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1420 can also comprises software code executed by processor 1410 to control the functions of device 1400, including configuring and controlling various components such as transceiver 1440, user interface 1450, and/or host interface 1460. Program memory 1420 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from device 1400, from which the instructions can be downloaded into program memory 1420 located within or removably coupled to device 1400, so as to enable execution of such instructions.

Data memory 1430 can comprise memory area for processor 1410 to store variables used in protocols, configuration, control, and other functions of device 1400, including operations corresponding to, or comprising, any of the exemplary methods and/or procedures described herein. Moreover, program memory 1420 and/or data memory 1430 can comprise non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed. Persons of ordinary skill in the art will recognize that processor 1410 can comprise multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of device 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A transceiver 1440 can comprise radio-frequency transmitter and/or receiver circuitry that facilitates the device 1400 to communicate with other equipment supporting like wireless communication standards and/or protocols. In some exemplary embodiments, the transceiver 1440 includes a transmitter and a receiver that enable device 1400 to communicate with various 5G/NR networks according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, the transceiver 1440 includes an LTE transmitter and receiver that can facilitate the device 1400 to communicate with various LTE, LTE-Advanced (LTE-A), and/or NR networks according to standards promulgated by 3GPP. In some exemplary embodiments of the present disclosure, the transceiver 1440 includes circuitry, firmware, etc. necessary for the device 1400 to communicate with various 5G/NR, LTE, LTE-A, UMTS, and/or GSM/EDGE networks, also according to 3GPP standards. In some exemplary embodiments of the present disclosure, transceiver 1440 includes circuitry, firmware, etc. necessary for the device 1400 to communicate with various CDMA2000 networks, according to 3GPP2 standards.

In some exemplary embodiments of the present disclosure, the transceiver 1440 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, transceiver 1440 can comprise a transceiver that is capable of wired communication, such as by using IEEE 802.3 Ethernet technology. The functionality particular to each of these embodiments can be coupled with or controlled by other circuitry in the device 1400, such as the processor 1410 executing program code stored in program memory 1420 in conjunction with, or supported by, data memory 1430.

User interface 1450 can take various forms depending on the particular embodiment of device 1400, or can be absent from device 1400 entirely. In some exemplary embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the device 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1400 having a touch screen display are capable of receiving user inputs, such as inputs related to exemplary methods and/or procedures described herein or otherwise known to persons of ordinary skill in the art.

In some exemplary embodiments of the present disclosure, device 1400 can comprise an orientation sensor, which can be used in various ways by features and functions of device 1400. For example, the device 1400 can use outputs of the orientation sensor to determine when a user has changed the physical orientation of the device 1400's touch screen display. An indication signal from the orientation sensor can be available to any application program executing on the device 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the device 1400 can take various forms depending on the particular exemplary embodiment of device 1400 and of the particular interface requirements of other devices that the device 1400 is intended to communicate with and/or control. For example, the control interface 1460 can comprise an RS-232 interface, an RS-485 interface, a USB interface, an HDMI interface, a Bluetooth interface, an IEEE ("Firewire") interface, an IC interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1400 can comprise more functionality than is shown in FIG. 14 including, for example, a video and/or still-image camera, microphone, media player and/or recorder, etc. Moreover, transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the device 1400, including various exemplary methods and/or computer-readable media according to various exemplary embodiments of the present disclosure.

Figure 15:
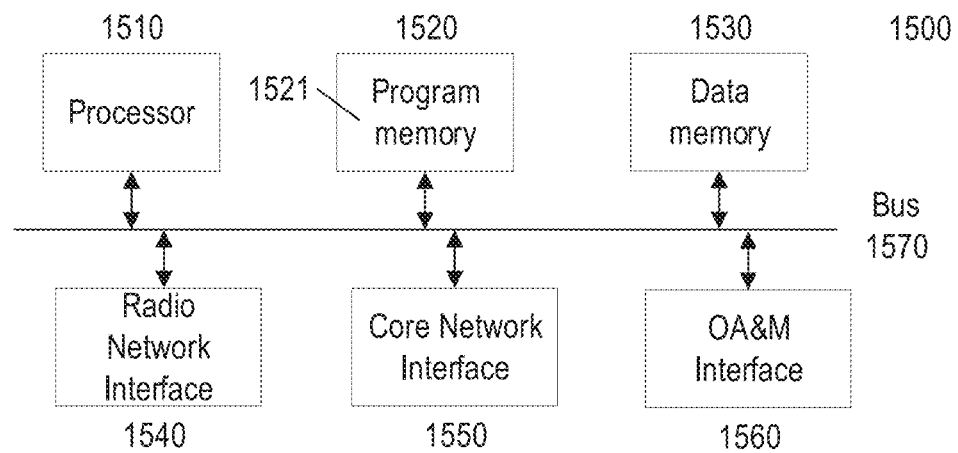
FIG. 15 illustrates a block diagram of an exemplary network node configurable according to various embodiments.

FIG. 15 shows a block diagram of an exemplary network node 1500 configurable according to various embodiments of the present disclosure, including those described above with reference to other figures. In some exemplary embodiments, network node 1500 can comprise a base station, eNB, gNB, or component thereof. Network node 1500 comprises processor 1510 which is operably connected to program memory 1520 and data memory 1530 via bus 1570, which can comprise parallel address and data buses, serial ports, or other methods and/or structures known to those of ordinary skill in the art.

Program memory 1520 can store software code, programs, and/or instructions (collectively shown as computer program product 1521 in FIG. 15) executed by processor 1510 that can configure and/or facilitate network node 1500 to perform various operations, including operations described below. For example, execution of such stored instructions can configure network node 1500 to communicate with one or more other devices using protocols according to various embodiments of the present disclosure, including one or more exemplary methods and/or procedures discussed above. Furthermore, execution of such stored instructions can also configure and/or facilitate network node 1500 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1540 and core network interface 1550. By way of example and without limitation, core network interface 1550 can comprise the Si interface and radio network interface 1550 can comprise the Uu interface, as standardized by 3GPP. Program memory 1520 can also include software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can comprise multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill in the art will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some exemplary embodiments, core network interface 1550 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
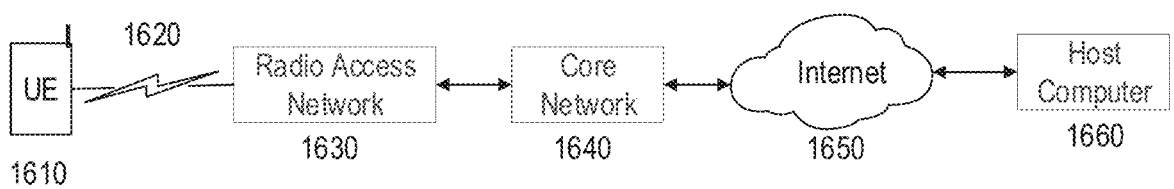
FIG. 16 illustrates a block diagram of an exemplary network configuration usable to provide over-the-top (OTT) data services between a host computer and a UE, according to various exemplary embodiments.

FIG. 16 is a block diagram of an exemplary communication network configured to provide over-the-top (OT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above. RAN 1630 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some exemplary embodiments, RAN 1630 and core network 1640 can be configured and/or arranged as shown in other figures discussed above. For example, eNBs comprising an E-UTRAN 1630 can communicate with an EPC core network 1640 via an Si interface, such as illustrated in FIG. 1. As another example, gNBs comprising a NR RAN 1630 can communicate with a 5GC core network 1630 via an NG interface, such as illustrated in FIGS. 12-13.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1630 operation in unlicensed spectrum, particularly to indicate, assign, and/or configure time resources for UEs—such as UE 1610—to transmit on an UL shared channel in unlicensed spectrum. For example, by assigning different transmission starting symbols within a timeslot, such techniques can reduce UL contention between UEs that are assigned the same UL timeslot resources. When used in NR UEs (e.g., UE 1610) and gNBs (e.g., gNBs comprising RAN 1630), exemplary embodiments described herein can provide various improvements, benefits, and/or advantages that facilitate the use of unlicensed spectrum in addition to licensed spectrum. Using additional spectrum resources to provide services improves the performance of these services as experienced by OTT service providers and end-users, including more consistent data throughout and fewer delays without excessive UE power consumption or other reductions in user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

1. A method for transmitting information on an uplink (UL) shared channel within a cell of a radio access network (RAN), the method comprising:
   receiving, from a network node serving the cell, a configuration of a periodic plurality of durations available for transmitting information on the UL shared channel, wherein the configuration comprises:

a periodicity value indicating an integer number of consecutive timeslots associated with each duration; and an allowance value indicating particular timeslots, within each periodicity, during which transmission on the UL shared channel is allowed; and transmitting information on the UL shared channel during at least one duration of the configured periodic plurality of durations.

2. The method of embodiment 1, wherein the configuration further identifies a starting timeslot within each duration and the allowance value indicates a number of timeslots, such that the particular timeslots comprise the number of timeslots beginning with the starting timeslot.

3. The method of embodiments 1, wherein:
the allowance value comprises a first bitmap including a first plurality of bits; and
each bit of the first plurality is associated with a particular timeslot within each periodicity.

4. The method of any of embodiments 1-3, wherein each timeslot comprises a plurality of symbols, and the configuration further identifies particular symbols of the plurality, within each allowed timeslot, during which transmission on the UL shared channel is allowed.

5. The method of embodiment 4, wherein the identification of the particular symbols comprises a starting symbol and a number of consecutive symbols.

6. The method of embodiment 4, wherein the identification of the particular symbols comprises a starting symbol associated with the starting timeslot and an ending symbol associated with the last allowed timeslot within each duration.

7. The method of any of embodiments 1-6, wherein the configuration further includes information identifying one or more instances of the UL shared channel within each duration.

8 The method of embodiment 7, wherein the configuration includes periodicity of the UL shared channel within each duration.

9. The method of embodiment 7, wherein the configuration indicates the respective starting positions of a plurality of UL shared channel instances within each duration.

10. The method of embodiment 9, wherein:
the configuration indicates the respective starting positions by a second bitmap including a second plurality of bits; and
each bit of the second plurality is associated with a particular timeslot within each subframe.

11. The method of any of embodiments 1-10, wherein the configuration further indicates whether the configuration is applicable to all allowed timeslots within each duration or only to a subset of allowed timeslots within each duration.

12. The method of any of embodiments 1-11, wherein the configuration further indicates to which traffic classes the configuration is applicable.

13. A method for scheduling transmission, by user equipment (UEs), of information on an uplink (UL) shared channel within a cell of a radio access network (RAN), the method comprising:
transmitting, to a user equipment (UE) operating within the cell, a configuration of a periodic plurality of durations available for transmitting information on the UL shared channel, wherein the configuration comprises:
a periodicity value indicating an integer number of consecutive timeslots associated with each duration; and
an allowance value indicating particular timeslots, within each periodicity, during which transmission on the UL shared channel is allowed; and
receiving, from the UE, information on the UL shared channel during at least one duration of the configured periodic plurality of durations.

14. The method of exemplary embodiment 13, wherein the configuration further identifies a starting timeslot within each duration and the allowance value indicates a number of timeslots, such that the particular timeslots comprise the number of timeslots beginning with the starting timeslot.

15. The method of exemplary embodiment 13, wherein:
the allowance value comprises a first bitmap including a first plurality of bits; and
each bit of the first plurality is associated with a particular timeslot within each periodicity 16. The method of any of exemplary embodiments 13-15, wherein each timeslot comprises a plurality of symbols, and the configuration further identifies particular symbols of the plurality, within each allowed timeslot, during which transmission on the UL shared channel is allowed.

17. The method of exemplary embodiment 16, wherein the identification of the particular symbols comprises a starting symbol and a number of consecutive symbols.

18. The method of exemplary embodiment 16, wherein the identification of the particular symbols comprises a starting symbol associated with the starting timeslot and an ending symbol associated with the last allowed timeslot within each duration.

19. The method of any of exemplary embodiments 13-18, wherein the configuration further includes information identifying one or more instances of the UL shared channel within each duration.

20. The method of embodiment 19, wherein the configuration includes periodicity of the UL shared channel within each duration.

21. The method of embodiment 19, wherein the configuration indicates the respective starting positions of a plurality of UL shared channel instances within each duration.

22. The method of embodiment 21, wherein:
the configuration indicates the respective starting positions by a second bitmap including a second plurality of bits; and
each bit of the second plurality is associated with a particular timeslot within each subframe.

23. The method of any of embodiments 13-22, wherein the configuration further indicates whether the configuration is applicable to all allowed timeslots within each duration or only to a subset of allowed timeslots within each duration.

24. The method of any of embodiments 13-23, wherein the configuration further indicates to which traffic classes the configuration is applicable.

25. A user equipment (UE) configured to transmit information on an uplink (UL) shared channel within a cell of a radio access network (RAN), the UE comprising:
communication circuitry configured to communicate with a network node serving the cell; and processing circuitry operatively associated with the communication circuitry and configured to perform operations corresponding to the methods of any of exemplary embodiments 1-12.

26. A network node configured to schedule transmission, by user equipment (UEs), of information on an uplink (UL) shared channel within a cell of radio access network (RAN), the network node comprising:
communication circuitry configured to communicate with the UEs; and
processing circuitry operatively associated with the communication circuitry and configured to perform operations corresponding to the methods of any of exemplary embodiments 13-24.

27. A non-transitory, computer-readable medium storing computer-executable instructions that, when executed by at least one processor of a user equipment (UE), configure the UE to perform operations corresponding to the methods of any of exemplary embodiments 1-12.

28. A non-transitory, computer-readable medium storing computer-executable instructions that, when executed by at least one processor of a network node, configure the network node to perform operations corresponding to the methods of any of exemplary embodiments 13-24.

The invention claimed is:

1. A method for transmitting information on an uplink (UL) shared channel within a cell of a radio access network, the method comprising:
receiving, from a network node serving the cell, a configured uplink grant of resources for a plurality of UL shared channels, wherein the configured uplink grant includes:
first information identifying particular timeslots during which transmission is allowed; and
second information identifying a plurality of consecutive instances of the UL shared channels within each timeslot, wherein the second information is applicable to all of the particular timeslots identified by the first information; and
transmitting information on at least one of the plurality of consecutive UL shared channels identified by the second information, during one or more of the particular timeslots identified by the first information.

2. The method of claim 1, wherein:
each timeslot includes a plurality of symbols; and
the second information includes a periodicity, in symbols, of the plurality of consecutive UL shared channels within a timeslot.

3. The method of claim 1, wherein the second information indicates respective starting positions of the plurality of consecutive UL shared channels within a timeslot.

4. The method of claim 1, wherein each of the plurality of UL shared channels comprises a plurality of consecutive symbols within a timeslot.

5. The method of claim 1, wherein the first information includes:
a periodicity parameter indicating an uplink periodicity for configured resources, and
an allowance parameter indicating a number of timeslots, within each uplink periodicity, during which transmission is allowed.

6. The method of claim 5, wherein the allowance parameter indicates a number of consecutive timeslots within each uplink periodicity during which transmission is allowed.

7. The method of claim 6, wherein:
the first information also identifies a starting timeslot within the number of consecutive timeslots indicated by the periodicity parameter; and
the particular timeslots include the number of consecutive timeslots beginning with the starting timeslot.

8. The method of claim 6, wherein:
the allowance parameter comprises a first bitmap including a first plurality of bits; and
each bit in the first bitmap indicates whether transmission is allowed during a particular one of the consecutive timeslots.

9. The method of claim 1, wherein the configured uplink grant also indicates one or more of the following:
whether the configured uplink grant applies to all of the particular timeslots identified by the first information, or only to a subset of the particular timeslots identified by the first information; and
traffic classes to which the configured uplink grant applies.

10. The method of claim 1, wherein the information transmitted on the at least one of the plurality of consecutive UL shared channels comprises transport blocks associated with respective at least one hybrid ARQ (HARQ) process.

11. A method for scheduling transmission, by user equipment (UEs), of information on an uplink (UL) shared channel within a cell of a radio access network, the method comprising:
transmitting, to a user equipment (UE) operating within the cell, a configured uplink grant of resources for a plurality of UL shared channels, wherein the configured uplink grant includes:
first information identifying particular timeslots during which transmission is allowed; and
second information identifying a plurality of consecutive UL shared channels within each timeslot, wherein the second information is applicable to all of the particular timeslots identified by the first information; and
receiving, from the UE, information on at least one of the plurality of consecutive UL shared channels identified by the second information, during one or more of the particular timeslots identified by the first information.

12. The method of claim 11, wherein:
each timeslot includes a plurality of symbols; and
the second information includes a periodicity, in symbols, of the plurality of consecutive UL shared channels within a timeslot.

13. The method of claim 11, wherein the second information indicates respective starting positions of the plurality of consecutive UL shared channels within a timeslot.

14. The method of claim 11, wherein each of the plurality of UL shared channels comprises a plurality of consecutive symbols within a timeslot.

15. The method of claim 11, wherein the first information includes:
a periodicity parameter indicating an uplink periodicity for configured resources, and
an allowance parameter indicating a number of timeslots, within each uplink periodicity, during which transmission is allowed.

16. The method of claim 15, wherein the allowance parameter indicates a number of consecutive timeslots within each uplink periodicity during which transmission is allowed.

17. The method of claim 16, wherein:
the first information also identifies a starting timeslot within the number of consecutive timeslots indicated by the periodicity parameter; and
the particular timeslots include the number of consecutive timeslots beginning with the starting timeslot.

18. The method of claim 16, wherein:
the allowance parameter comprises a first bitmap including a first plurality of bits; and
each bit in the first bitmap indicates whether transmission is allowed during a particular one of the consecutive timeslots.

19. The method of claim 11, wherein the configured uplink grant also indicates one or more of the following:
whether the configured uplink grant applies to all of the particular timeslots identified by the first information, or only to a subset of the particular timeslots identified by the first information; and
traffic classes to which the configured uplink grant applies.

20. The method of claim 11, wherein the information transmitted on the at least one of the plurality of consecutive UL shared channels comprises transport blocks associated with respective at least one hybrid ARQ (HARQ) process.

21. A user equipment (UE) configured to transmit information on an uplink (UL) shared channel within a cell of a radio access network, the UE comprising:
transceiver circuitry configured to communicate with a network node serving the cell; and
processing circuitry operatively coupled to the transceiver circuitry, whereby the processing circuitry and the transceiver circuitry are configured to cause the UE to:
receive, from the network node, a configured uplink grant of resources for a plurality of UL shared channels, wherein the configured uplink grant includes:
first information identifying particular timeslots during which transmission is allowed; and
second information identifying a plurality of consecutive UL shared channels within each timeslot, wherein the second information is applicable to all of the particular timeslots identified by the first information; and
transmit information on at least one of the plurality of consecutive UL shared channels identified by the second information, during one or more of the particular timeslots identified by the first information.

22. A non-transitory, computer-readable medium storing computer-executable instructions that, when executed by at least one processor of a user equipment (UE), configure the UE to perform operations corresponding to the method of claim 1.

23. A network node configured to schedule transmission, by user equipment (UEs), of information on an uplink (UL) shared channel within a cell of a radio access network, the network node comprising:
radio network interface circuitry configured to communicate with UEs via the cell; and
processing circuitry operably coupled to the radio network interface circuitry, wherein the processing circuitry and the radio network interface circuitry are configured to perform operations corresponding to the method of claim 11.

24. A non-transitory, computer-readable medium storing computer-executable instructions that, when executed by processing circuitry of a network node configured to schedule transmission by user equipment (UEs) on an uplink (UL) shared channel within a cell of a radio access network, configure the network node to perform operations corresponding to the method of claim 11.

* * * * *